United States Patent [19]
Mazzoni et al.

[11] 3,990,429
[45] Nov. 9, 1976

[54] SOLAR HEAT COLLECTOR HAVING A BREATHER TUBE

[75] Inventors: Renato J. Mazzoni, Tarentum; Lester F. Schutrum, New Kensington, both of Pa.

[73] Assignee: PPG Industries, Inc., Pittsburgh, Pa.

[22] Filed: Feb. 18, 1975

[21] Appl. No.: 550,680

[52] U.S. Cl. .............................. 126/271; 52/172
[51] Int. Cl.² ............................................ F24J 3/02
[58] Field of Search ............ 126/270, 271; 237/1 A; 52/172

[56] References Cited
UNITED STATES PATENTS

| | | | |
|---|---|---|---|
| 1,250,260 | 12/1917 | Wilcox | 126/271 |
| 3,453,666 | 7/1969 | Hedges | 126/271 |
| 3,771,276 | 11/1973 | Stewart | 52/172 |

FOREIGN PATENTS OR APPLICATIONS 938,012   9/1963   United Kingdom ................. 126/271

Primary Examiner—Kenneth W. Sprague
Assistant Examiner—James C. Yeung
Attorney, Agent, or Firm—Donald Carl Lepiane

[57] ABSTRACT

A solar heat collector has a breather tube to provide communication between the ambient air and air in the airspace of the collector through desiccant material. In this manner, the air pressure in the airspace is equalized to the ambient air pressure without moisture moving into the airspace and the desicant material is regenerated.

11 Claims, 6 Drawing Figures

U.S. Patent  Nov. 9, 1976  3,990,429
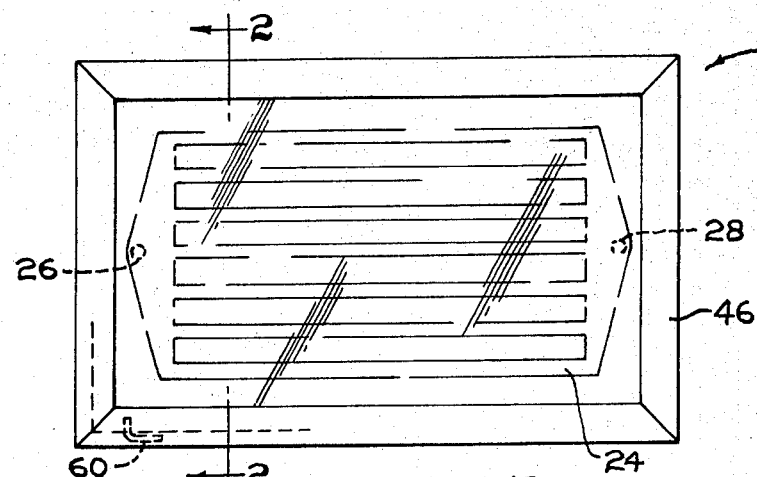
Fig.1
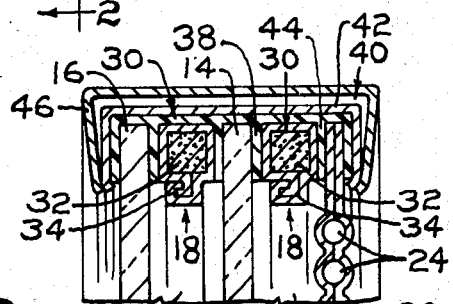
Fig.2
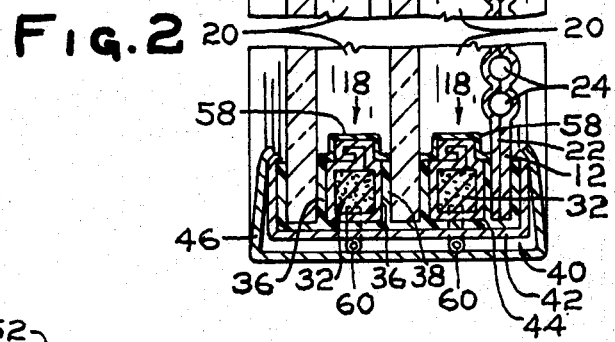
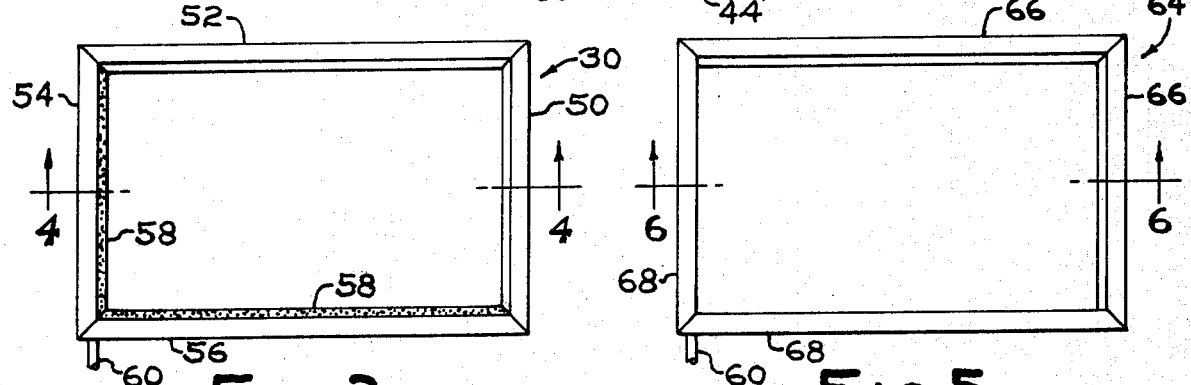
Fig.3  Fig.5
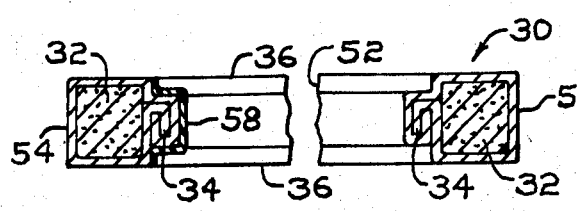
Fig.4
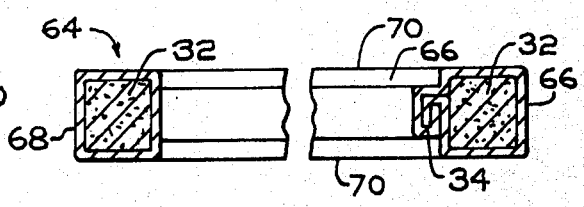
Fig.6

SOLAR HEAT COLLECTOR HAVING A BREATHER TUBE

RELATED U.S. PATENT APPLICATIONS

The method of removing volatiles in a moisture-impervious adhesive taught in commonly assigned U. S. Pat. application Ser. No. 550,679 filed even date in the names of George H. Bowser, Renato J. Mazzoni and Lester F. Schutrum and entitled "Method of Fabricating a Solar Heat Collector" may be practiced with the invention and the teachings therein are hereby incorporated by reference.

BACKGROUND OF THE INVENTION

1. Field of the Invention.

This invention relates to a solar heat collector having a breather tube.

2. Discussion of the Technical Problems.

The advantages of solar heat collectors to collect solar energy for subsequent use have been recognized in the prior art. For example, in U.S. Pat. No. 2,462,952, there is taught the use of solar energy to activate a desiccant material used to absorb moisture from an enclosure. In general, a receptacle is filled with desiccant material and mounted on the upper portion of the enclosure. Communication is provided (1) between the interior of the enclosure and the desiccant material and (2) between the atmosphere and the desiccant material. The outer surface of the receptacle and the enclosure are heated by solar energy to heat the desiccant material and expand the air in the enclosure. The expanded air moves from the enclosure through the desiccant material and into the atmosphere to dehumidify the enclosure. The heating of the desiccant material by solar energy and the movement of air therethrough activates the desiccant material.

The solar heat collector of the above-identified patent has drawbacks. More particularly, a portion of the absorbed solar energy is lost due to conduction and/or convection heat losses to the atmosphere.

In U.S. Pat. application Ser. No. 450,703 filed on Mar. 13, 1974, in the name of Pandit G. Patil and entitled "Solar Heat Collector Window" there is taught a solar heat collector that reduces conduction and/or convection heat losses to the atmosphere by providing an outer cover plate, an intermediate cover plate, a solar radiation absorber and a spacer assembly. The spacer assembly (1) maintains the outer cover plate, intermediate cover plate and absorber in spaced relationship to provide airspaces therebetween; (2) removes moisture from the airspaces between the cover plates and absorber; and (3) prevents moisture from entering the airspace between the cover plates and the absorber. The cover plates reduce heat losses to the atmosphere and the spacer assemblies maintain the air in the airspaces free of moisture.

Although the solar heat collector taught in the above-mentioned U.S. Pat. application is ideally suitable for collecting solar radiation for subsequent use, the solar heat collector has limitations. For example, during use, the absorber absorbs solar radiation and is heated. The airspace between the adjacent cover plate and the absorber is heated by convection and/or conduction. As the air in the airspace is heated, it expands in volume, exerting pressure to move the absorber and the cover plates away from each other. As can be appreciated, during extremely hot days the pressure of expanded air in the airspace may be of sufficient magnitude to cause a break in the spacer assemblies allowing moisture to enter the airspaces. The moisture in the airspaces condenses on the cover plates and absorber reducing the transmittance coefficient of the cover plates, reducing the absorptivity coefficient of the absorber and/or increasing the emissivity coefficient of the absorber.

It would be advantageous therefore if a solar heat collector was available that did not have the limitations of the prior art heat collectors. More particularly, a solar heat collector having a breather tube to compensate for air pressure changes within the collector while keeping moisture from entering the airspace.

SUMMARY OF THE INVENTION

This invention relates to an improved solar heat collector. The solar heat collector is of the type having plate facilities for passing solar radiation and for reducing convection and radiation heat losses from the collector and a solar energy absorber. Facilities are further provided for maintaining the plate and absorber in spaced relation to provide an airspace therebetween and for preventing the movement of ambient air into and out of the airspace.

The improvement includes facilities communicating with the airspace and the ambient air for permitting the egress of air from the airspace when the air pressure in the airspace exceeds the ambient air pressure and for permitting the ingress of moisture free air into the airspace when the pressure of the airspace is less than the ambient air pressure.

This invention also relates to a solar heat collector having a system for regenerating desiccant material in the spacer assembly. The solar collector is of the type having a solar energy absorber and plate facilities for passing solar radiation and reducing convection and radiation losses. A spacer frame having the desiccant material therein is mounted between the absorber and plate facilities to provide an airspace therebetween. A moisture-impervious seal is provided to prevent moisture from moving into the airspace. The spacer frame and moisture-impervious seal form the spacer assembly.

The invention provides that the spacer frame includes a first tubular section having moisture-impervious surfaces and a second tubular section communicating with the first tubular section and having at least one passageway to provide communication between the interior of the second tubular section and the airspace. The desiccant material is provided in the first and second tubular section. Facilities provide communication between the ambient air and the interior of the first tubular section.

When the absorber is heated by solar radiation, the air in the airspace, the spacer frame, and the desiccant material are heated. Heating the desiccant material drives moisture therefrom and heating the air in the airspace expands the air. The heated expanded air moves through the at least one passageway, the desiccant material in the second and first tubular section, and out of the communication facilities removing any moisture driven out of the desiccant material. In this manner, moisture in the desiccant is removed and the desiccant is regenerated.

This invention also relates to a method of fabricating a solar heat collector. The method includes the steps of providing at least one plate capable of passing solar energy and a solar energy absorber in spaced relation.

A tubular spacer frame is provided between the plate and the absorber to define an airspace therebetween. The spacer frame has a first column of desiccant material in communication with the airspace and a second column of desiccant material in communication with the first column of desiccant material and the ambient air. Thereafter a moisture-impervious seal is provided to prevent moisture from moving into the airspace so that movement into and out of the airspace is through the desiccant material.

BRIEF DESCRIPTION OF THE DRAWING

FIG. 1 is a frontal view of a solar heat collector constructed in accordance to the teachings of the invention;

FIG. 2 is a fragmented view of a view taken along lines 2—2 of FIG. 1;

FIG. 3 is a frontal view of a spacer frame having a breather tube and constructed in accordance to the teachings of the invention;

FIG. 4 is a view taken along lines 4—4 of FIG. 3;

FIG. 5 is an alternate type of spacer frame that may be constructed in accordance to the teachings of the invention; and FIG. 6 is a view taken along lines 6—6 of FIG. 5.

DESCRIPTION OF THE INVENTION

This invention relates to a solar heat collector having a breather tube to equalize the pressure within the solar heat collector to the pressure without the solar heat collector, i.e., ambient air pressure and a system for regenerating desiccant material used to absorb moisture in the collector window.

Although the invention will be practiced on the solar heat collector of the type disclosed in U.S. Pat. application Ser. No. 450,703 filed on Mar. 13, 1974, in the name of Pandit G. Patil and entitled "Solar Heat Collector Window", it will become readily apparent to those skilled in the art that the invention is not limited thereto.

Referring to FIG. 1, there is shown a solar heat collector 10 of the type disclosed in the above-mentioned application incorporating features of the invention. In general and with reference to FIGS. 1 and 2, the solar heat collector 10 includes a solar radiation and infrared absorber 12, an intermediate cover plate 14 and an outer cover plate 16.

The absorber 12, the intermediate cover plate 14 and the outer cover plate 16 are held in spaced relation by the spacer assemblies 18. The spacer assemblies 18 (1) absorbs moisture trapped in airspaces 20 between the cover plates and absorber during fabrication; (2) prevents moisture from moving into the airspaces 20 during use of the solar heat collector and (3) equalizes the pressure in the airspaces to the ambient air pressure.

The absorber 12 may be any of the types used in the solar collector art. In general, the solar absorber 12 is made of heat conductive material such as aluminum, steel or copper. Surface 22 of the absorber facing the sun is normally treated so as to provide maximum efficiency in absorbing solar radiation for subsequent use. For example and not limiting to the invention, the absorber 12 heats a heat absorbing medium moving through conduits 24 provided in the absorber 12. The heat absorbing medium, e.g., water or a mixture of water and ethylene glycol, is moved into inlet pipe 26 through the conduits 24 and out of the conduits by way of outlet pipe 28 (see FIG. 1).

The intermediate and outer cover plates 14 and 16, respectively, are selected to pass solar radiation to the collector and to minimize convection and radiation heat losses of the solar collector. Normally, the cover plates are made of glass that may be thermally or chemically tempered. Further, if desired, one or both of the glass plates may be selectively coated as taught in U.S. patent application Ser. No. 450,702 filed on Mar. 13, 1974, in the name of Frank H. Gillery and entitled "Solar Heat Collector".

Each of the spacer assemblies 18, in general, includes a spacer frame 30, shown better in FIGS. 3 and 4 having a desiccant material 32 therein such as silica gel or molecular sieve. Communication between the airspaces 20 and the desiccant material 32 is provided through a plurality of channels or passageways 34 provided in the spacer. Opposed surfaces 36 of the spacer frame are adhered to marginal surfaces of the cover plates and absorber by a moisture-impervious adhesive 38 of the type known in the art. "Moisture-impervious adhesive" as the term is used is adhesive that prevents moisture from moving into the airspace while adhesively bonding the spacer frame, cover plates and absorber together. The spacer frame and adhesive 38 provide a primary moisture-impervious seal. The moisture-impervious adhesive may be any of the types used in the solar collector art, for example, of the type disclosed in U.S. patent application Ser. No. 550,679 filed even date in the names of George H. Bowser, Renato J. Mazzoni and Lester F. Schutrum and entitled "Method of Fabricating a Solar Heat Collector". The teachings of the above-identified application are hereby incorporated by reference.

Although not limiting to the invention, but recommended to provide an additional moisture-impervious seal, there is provided a composite strip 40. The composite strip 40 including a bendable-formable tape 42 is made of a moisture-impervious material, e.g., metal such as aluminum having a layer 44 of moisture-impervious adhesive thereon. The strip 40 is preferably provided around (1) the peripheral edge portions of the spacers, cover plates and absorber and (2) the marginal edge portions of the outer cover plate 16 and absorber 12 as shown in FIG. 2. The composite strip 40 provides a secondary moisture-impervious seal.

Preferably, but not limiting to the invention, a channel member 46 of essentially U-shaped cross-section also extends completely around the perimeter of the solar collector window. The channel member generally includes several sections of channeling that are joined or abutted together at their ends. The channel member 40 urges the marginal edges of the cover plates and absorbers toward each other about the adjacent spacer frame and protects the edges of the cover plates.

During use of the solar heat collector, air pressure in the airspace 20 changes. For example, during the day the absorber 12 absorbs solar energy and is heated. The air in the airspaces 20 is heated by convection and/or conduction. As the air is heated it expands and applies forces to move the absorber and the cover plates apart. On extremely sunny days, the pressure may be of sufficient magnitude to damage the spacer assemblies, e.g., generate a crack in the moisture-impervious adhesives 38 and 44. When this occurs, moisture in the atmosphere can easily pass into the airspace and condenses on the cover plates and absorber during temperature changes. More particularly, the following is believed to occur when the spacer assembly is damaged. During the day, the absorber is heated by solar radiation which causes the air in the airspace to expand. When the air expands, it has a pressure greater than the ambient air pressure and moves out of the airspace through cracks in the adhesive. In the evenings, the air pressure in the airspace decreases, thereby pulling ambient air into the airspace through the cracks in the adhesive. The air now in the airspace has moisture and condenses on the cover plates and absorber.

When moisture condenses on the cover plates and absorber, the efficiency of the solar heat collector is reduced. This is because (1) the moisture condensing on the cover plates decreases the transmittance coefficient of the cover plates and the moisture condensing on the absorber plate decreases the absorptivity coefficient of the absorber while increasing its emissivity coefficient. The transmittance coefficient of the cover plates is reduced by the moisture which acts as a barrier to solar radiation. The absorptivity coefficient of the absorber is decreased and the emissivity coefficient of the absorber increases for the following reasons. Moisture collects dust which deposits on the absorber and remains after the moisture is evaporated by solar energy and certain coatings used to increase the efficiency of the absorber, e.g., nickel oxide are dissolved by moisture. In general, one percent decrease in the absorptivity coefficient increases the emissivity coefficient by 5 percent.

The discussion will now be directed to the principles of the invention which provide for relieving any pressure build-up that may occur within the airspace while preventing moisture from moving into the airspace. Although in the following discussion two embodiments of the invention will be presented, it will be appreciated by those skilled in the art that the invention is not limited thereto and other breather type arrangements may be derived from the following discussion and are within the scope of the invention.

Referring to FIGS. 3 and 4, there is shown the spacer frame 30 which includes four lock seam spacer sections 50, 52, 54 and 56. The lock seam spacers are of the type disclosed in U.S. Pat. No. 2,684,266. Two adjacent sections, e.g., 54 and 56 of the spacer frame have the passageways 34 plugged as for example (1) coating the passageways 34 with a moisture-impervious adhesive, non-porous paint or with an epoxy 58 or (2) pressing the walls of the passageways 34 together. The passageways 34 of the remaining section, e.g., sections 50 and 52, remain open. The desiccant material 32 is provided in the spacer frame 30. An inlet capillary tube 60 is provided on the section 56 of the spacer frame 30. The tube 60 is preferably positioned on the section 56 an equal distance from the ends of the sections 50 and 52.

The inside passageway dimensions of the capillary tube 60 are related to the length of the desiccant material and the volume of the desiccant material. This is to insure that the moisture in the ambient air entering the airspace is removed. Further, the capillary tube passageway dimensions should be selected to prevent large particles of dust and dirt from entering which could clog the capillary tube. In general and not limiting to the invention, a capillary tube passageway of about 0.020 (0.05 centimeter) to 0.125 inch (0.3 centimeter) used with a column of desiccant material 3 feet (0.9 meter) long and a volume of desiccant material of 9 cubic inches (147 millileters) are acceptable.

The ratio of the dimensions of the passageways 34 in the spacer frame 30 (see FIG. 4) to the capillary tube passageway dimensions are not considered critical to the invention. This is because pressure changes in the airspaces are gradual thereby eliminating rapid changes in pressure differentials between the ambient air and air in the airspaces.

Referring now to FIG. 2, the tube 60 extends beyond the tape 42 so as to provide communication between the desiccant material 32 in the spacer frame and the ambient air.

When the spacer frame 30 as shown in FIGS. 3 and 4 is employed in a solar heat collector of the type previously discussed, any pressure changes within the airspaces 20 are relieved by the air moving through the passageways 34 of sections 50 and 52, of the spacer frame, through the desiccant material in sections 54 and 56 and out of the capillary tube 60. When the surrounding ambient air pressure is greater than the pressure within the airspaces 20, air moves into the airspace through the capillary tube 60, the desiccant material in the sections 54 and 56, the desiccant material in sections 52 and 50, and through the passageways 34 into the airspace. In this manner, the air pressure within the airspace is continually equalized with the surrounding ambient air pressure.

Further by providing for the ingress of air through the desiccant material in sections 54 and 56, any moisture in the air as it moves toward the passageways 34 in sections 50 and 52 is absorbed by the desiccant material 32 thereby keeping moisture out of the airspace 20. The advantages of keeping moisture out of the airspaces was discussed, supra.

With reference to FIGS. 5 and 6, there is shown another embodiment of a spacer frame employing features of the invention. Spacer frame 64 includes two sections 66 of locked seam spacers of the type previously described and two sections 68 of tubular members joined together. The desiccant material 32 is provided in the lock seam spacer sections 66 and tubular sections 68. The desiccant material in the tubular sections 68 do not communicate with the airspaces 20 while the desiccant material in the lock seam spacer section as previously discussed have passageways 32 which provide communication with the airspaces 20 to remove moisture therefrom. Provided on the outer perimeter of the spacer frame is the capillary tube 60. The tube 60 preferably is positioned in a tubular section 68 approximately an equal distance from the ends of lock seam spacer sections 66.

The discussion will now be directed to the system for regenerating the desiccant material 32 in the spacer frame 30 (FIGS. 3 and 4) or 64 (FIGS. 5 and 6).

When the absorber 12 is heated by solar radiation, the air in the airspacer 20, the spacer frame 30 or 64 and the desiccant material 32 in the spacer frame are heated. The air in the airspace expands as it is heated and moves out of the airspaces 20 as previously described. As the hot air moves through the desiccant material, any moisture driven off by the heating of the desiccant is picked up by the hot air and is moved out of the capillary tube 60 with the expanding hot air from the airspace.

As can now be appreciated, the invention is not limited to any particular breather construction. For example, the breather disclosed in U.S. Pat. No. 3,771,276 may be used. Further, the invention is not limited to the number of cover plates or design of the solar collector.

The invention also contemplates using a breather tube for selected ones of airspacers adjacent the absorber 12 and not for others spaced a greater distance from the absorber 12.

DETAILED DESCRIPTION OF THE INVENTION

The invention will now be described to construct a solar heat collector in accordance with the teachings of the invention.

With reference to FIGS. 3 and 4, a spacer frame 30 is preferably constructed in the following manner. Four sections 50, 52, 54 and 56 of lock seam spacer such as the type disclosed in U.S. Pat. No. 2,684,266 are provided. A desiccant material 32, such as silica gel or molecular sieve, is provided in the spacer sections 50, 52, 54 and 56. The ends of the spacer sections are mitered and joined together in any conventional manner as by welding to provide the frame 30 as shown in FIG. 3 having dimensions of 7 feet (2.1 meters) × 3 feet (0.9 meter) × ½ inch (1.25 centimeters). A capillary 60, having an outside diameter of 0.070 inch (0.18 centimeter) and an inside diameter of 0.020 inch (0.05 centimeter) is provided in the outside wall of spacer section 56 adjacent joined ends of spacer sections 54 and 56 and communicating with the desiccant material 32.

The passageways 34 of spacer sections 54 and 56 are provided with a coating of paint 58 such as the type solid by PPG Industries, Incorporated, under the trademark DURACRON Super 600L/G to plug the passageways 34 in the spacer sections 54 and 56.

With reference to FIGS. 5 and 6, there is shown an alternate embodiment of a spacer frame. Spacer frame 64 as shown in FIGS. 5 and 6 is preferably constructed in the following manner. Two sections 66 of lock seam spacers having the desiccant material 32 are provided. The lock seam spacer sections are of the type disclosed in U.S. Pat. No. 2,684,266. Two sections 68 of tubular spacers 68 having the desiccant material therein are provided. The ends of the sections 66 and 68 are mitered and joined together as by welding to form a spacer frame. The dimensions of the sections 66 and 68 are selected to provide a spacer frame 64, 7 feet (2.1 meters) × 3 feet (0.9 meter) × ½ inch (1.25 centimeters).

The capillary tube 60 is provided on outer surface of a section 68 as shown in FIG. 5.

As can be appreciated, the invention is not limited to any particular configuration or size of frame and the dimensions given are merely illustrative for purposes of describing the invention.

Referring to FIG. 2, a pair of commercial soda-lime-glass sheets 14 and 16 having dimensions of 7 feet (2.1 meters) × 3 feet (0.9 meter) × ⅛ inch (0.32 centimeter) thick are provided. The glass sheets are preferably tempered so as to reduce the probability of breakage during use, e.g., from stones or hail. The glass sheets are cleaned in any conventional manner to remove any foreign particles that may inhibit the passing of solar radiation through the sheets toward absorber 12.

A layer of moisture-impervious adhesive 38 of the type disclosed in the above-mentioned U.S. patent application Ser. No. 550,679 in the names of George H. Bowser, Renato J. Mazzoni, and Lester F. Schutrum filed even date having a thickness of about 0.015 to 0.020 inch (0.13 to 0.05 centimeter) and a width of less than about 5/16 inch (0.8 centimeter) is extruded onto opposed surfaces 36 or 70 of the spacer frame 30 or 64, respectively.

Preferably the adhesive layer 38 is heated to remove volatiles thereby by heating the spacer frame 30 or 64 having the layers of adhesive 38 in accordance to the teachings of the abovementioned U.S. patent application Ser. No. 550,679 filed even date. During the heating of the adhesive layer, moisture in the desiccant material is driven out.

An absorber 12 is provided having a conduit 24. The conduit 24 is connected at one end to an inlet pipe 26 and the other end to an outlet pipe 28 for moving a heat absorbing medium, e.g., water or a mixture of water and ethylene glycol therethrough. The absorber dimensions are 7 feet (2.1 meters) × 3 feet (0.9 meter).

Surface 22 of the absorber facing the sun is coated with black paint such as the type sold by PPG Industries, Incorporated under the trademark DURACRON Super 600L/G and fired at a temperature of 350° F. (177° C.) for 15 to 20 minutes to provide the absorber with a heat absorbing surface having an absorptivity coefficient for solar energy in the wavelength of 0.3 to 2.1 microns and an emissivity coefficient for infrared energy in the wavelength of 2 to 20 microns of about 0.95.

The absorber 12 is positioned on a rigid surface with the surface 22 facing upward. The spacer frame 30 or 64 having the moisture-impervious adhesive on opposed outer surfaces is positioned on the absorber. The intermediate glass sheet 14 is positioned on top of the spacer frame. Thereafter a second spacer frame 30 or 64 is positioned on the intermediate glass sheet 14 followed by the outer glass sheet 16.

The adhesive 38 between the spacer frame, glass sheets 14 and 16 and the absorber 16 is flowed under a pressure of between about 2 to 10 pounds per square inch (0.14 – 0.7 kilograms per square centimeter) in any conventional manner to form a primary moisture-impervious seal.

Thereafter a composite strip 40 is provided. The strip includes a 1¾ inch (4.4 centimeters) wide aluminum tape 42 having a thickness of 0.010 inch (0.03 centimeter). A layer of moisture-impervious adhesive 44 is provided on one surface in any conventional manner. The adhesive 44 may be similar to the adhesive 38. The strip is applied in any conventional manner to the peripheral edges of the absorber, glass sheets and flat side of the spacer frame and bent over the marginal edge portions of the outer glass sheet and the absorber to provide a secondary moisture-impervious seal with the tube 60 extended beyond the tape 42.

Preferably the strip extends completely around the perimeter of the collector with the ends overlapping. To assure a good moisture-impervious seal, moisture-impervious adhesive is provided around the tube 60 where it extends through the tape 42 of the composite strip. Thereafter the tube is bent toward the tape 40 of the composite strip and a covering is preferably provided over the tube 60 to prevent extremely large particles of dust from moving into the tube which could clog the tube. The covering may be a piece of aluminum or a felt pad inserted into the end of the tube.

A channel member 46 of essentially U-shaped, cross-section is provided completely around the perimeter of the window to protect the edges and to provide structural stability by urging the glass sheets and absorber together against the spacer frames.

During use, the absorber 12 absorbs solar radiation to heat the heat absorbing medium. As the absorber is heated, the air in the air-spaces 20, the spacer frame 30 or 64 and the desiccant material 32 therein is heated by convection and/or conduction. Heating the desiccant material drives out moisture in the desiccant material. As the air in the airspacer 20 is heated, it expands and increases in pressure. When the pressure of the air in the airspace exceeds the ambient air pressure, the air in the airspacer moves through the passages 34 in the spacer elements, through the column of desiccant material in the spacer sections 54 and 56 or 68 and out of the collector window by way of tube 60. As the heated air moves through the desiccant material 34, it further heats the desiccant and in this manner, the pressure in the airspace is equalized to the ambient air pressure and the moisture driven out of the desiccant is removed therefrom to regenerate the desiccant material.

In the evening, when the absorber cools down and the air pressure in the airspacer 20 is less than the ambient air pressure, air is moved into the airspace. More particularly, air moves into the tube 60 through the desiccant material in the spacer sections 54 and 56 of spacer frame 30 or sections 68 of spacer frame 64 to the desiccant material in the spacer section 50 and 52 of the spacer frame 30 or sections 66 of the spacer frame 64 and into the airspaces 20 by way of passageways 32.

By practicing the invention, a solar heat collector is provided that has air pressure in its airspacer equal to the ambient air pressure. In this manner the spacer assemblies of the solar heat collector will not be damaged thereby keeping moisture out of the airspace at all times.

Further by practicing the invention, the desiccant material in the spacer frame is regenerated.

Although the invention was described for constructing a particular solar collector, it can now be appreciated that the invention is not limited thereto. The invention is directed specifically to a breather to maintain the air pressure within the solar collector equal to the surrounding ambient air pressures while preventing moisture from moving into the airspace in the solar heat collector and to a solar collector having a system for regenerating desiccant material in the spacer assembly.

What is claimed is:

1. In a solar heat collector of the type having a solar radiation absorber; plate means for passing solar radiation and for reducing heat losses; a spacer assembly between marginal edge portions of the plate means and absorber to provide an airspace therebetween; and means sealing the edge portions of the absorber and plate means to the spacer assembly to prevent the movement of air into and out of the airspace between the edge portions, the improvement comprising:
    the spacer assembly comprising desiccating material in the spacer assembly; and
    means in the spacer assembly communicating with the airspace for permitting the egress of air from the airspace when the air pressure in the airspace exceeds the ambient air pressure and the ingress of air through said desiccating material into the airspace when the pressure in the airspace is less than the ambient air pressure to move moisture-free air into the airspace.

2. The solar heat collector as set forth in claim 1 wherein the spacer assembly includes a spacer frame and said permitting means comprises:
    a first column of desiccant material in the spacer frame;
    means for providing communication between the airspace and said first column of desiccant material to absorb moisture in the airspace;
    a second column of desiccant material in the spacer frame; and
    means for providing communication between said first and second column of desiccant material in the spacer frame and providing communication between the ambient air and said second column of desiccant material such that the flow of air into the airspace is through said second column of desiccant material and then through said first column of desiccant material and the flow of air out of the airspace is through said first column of desiccant material and then through said second column of desiccant material.

3. The solar heat collector as set forth in claim 1 wherein said spacer assembly includes:
    a first tubular section having moisture-impervious surfaces;
    a second tubular section having its interior in communication with the interior of said first tubular section and a surface of said second tubular section of spacer facing the airspace provided with at least one passageway to provide communication between the airspace and the interior of said second tubular section;
    said first and second tubular section forming a spacer frame;
    desiccant material in the spacer frame; and
    said permitting means includes means for communicating said first tubular section with the ambient air such that ambient air moving into the airspacer passes through said desiccant material in said first tubular spacer, through said desiccant material in said second tubular section and through said at least one passageway into the airspace and the air in the airspace moves out of the airspace through said at least one passageway, said desiccant material in said second tubular section, through said desiccant in said first tubular section and through said communicating means.

4. The solar heat collector as set forth in claim 3 wherein said communicating means is a tube mounted in the surface of said first tubular section opposite to the surface facing the airspace and spaced from the ends of said second tubular section.

5. The solar heat collector as set forth in claim 1 wherein said plate means is a first glass sheet and further including a second glass sheet; a second spacer assembly between marginal edge portions of the first and second glass sheets to provide the collector with a second airspace; second means sealing the edge portions of the first and second glass sheets to the second spacer assembly to prevent movement of air into and out of the airspace between the edge portions of the first and second glass sheets.

6. The solar heat collector as set forth in claim 5 wherein the second spacer assembly comprises:
    desiccating material in the second spacer assembly; and
    means communicating with the second airspace for permitting the egress of air from the second airspace when the air pressure in the second airspace exceeds the ambient air pressure and the ingress of air through said desiccating material into the second airspace when the pressure in the second airspace is less than the ambient air pressure to move moisture-free air into the second airspace.

7. The solar heat collector as set forth in claim 6 wherein the second spacer assembly includes a spacer frame and means sealing includes:
moisture-impervious adhesive between the spacer frame of the second spacer assembly and marginal edges of the first and second glass sheets and between the spacer frame of the first spacer assembly and marginal edges of the absorber and first glass sheets; and
a bendable-formable tape having a layer of moisture-impervious adhesive thereon, said adhesive mounted on at least the peripheral edges of the first and second glass sheets and absorber.

8. The solar collector as set forth in claim 7 further including:
means for urging marginal edge portions of the absorber and glass sheets toward each other.

9. The solar heat collector as set forth in claim 8 wherein each of the spacer assemblies includes a spacer frame, said spacer frames comprising:
a first tubular section having a surface provided with at least one passageway to provide communication between the respective airspace and the interior of said first tubular section;
said first column of desiccant material in said first tubular section;
a second tubular section having its interior communicating with said first tubular section and having moisture-impervious surfaces;
said second column of desiccant material in said second tubular section in communication with said first column of desiccant material; and
means for providing communication between said second column of desiccant material and the ambient air.

10. The solar heat collector as set forth in claim 9 wherein said providing communication means is a tube mounted in the surface of said second section opposite to the surface facing the airspace and spaced from the at least one passageway.

11. The solar heat collector as set forth in claim 5 further including conduit means in thermal communication with the absorber for heating a heat absorbing medium by solar radiation as the medium is moved through said conduit means.

* * * * *